Sept. 8, 1931.          H. H. VAIL              1,822,716
                 SELECTIVE CLUTCH MECHANISM
                   Filed May 22, 1929        3 Sheets-Sheet 1

*Fig. 1.*

INVENTOR.
Henry H. Vail,
BY Robert M. Barr.
ATTORNEYS.

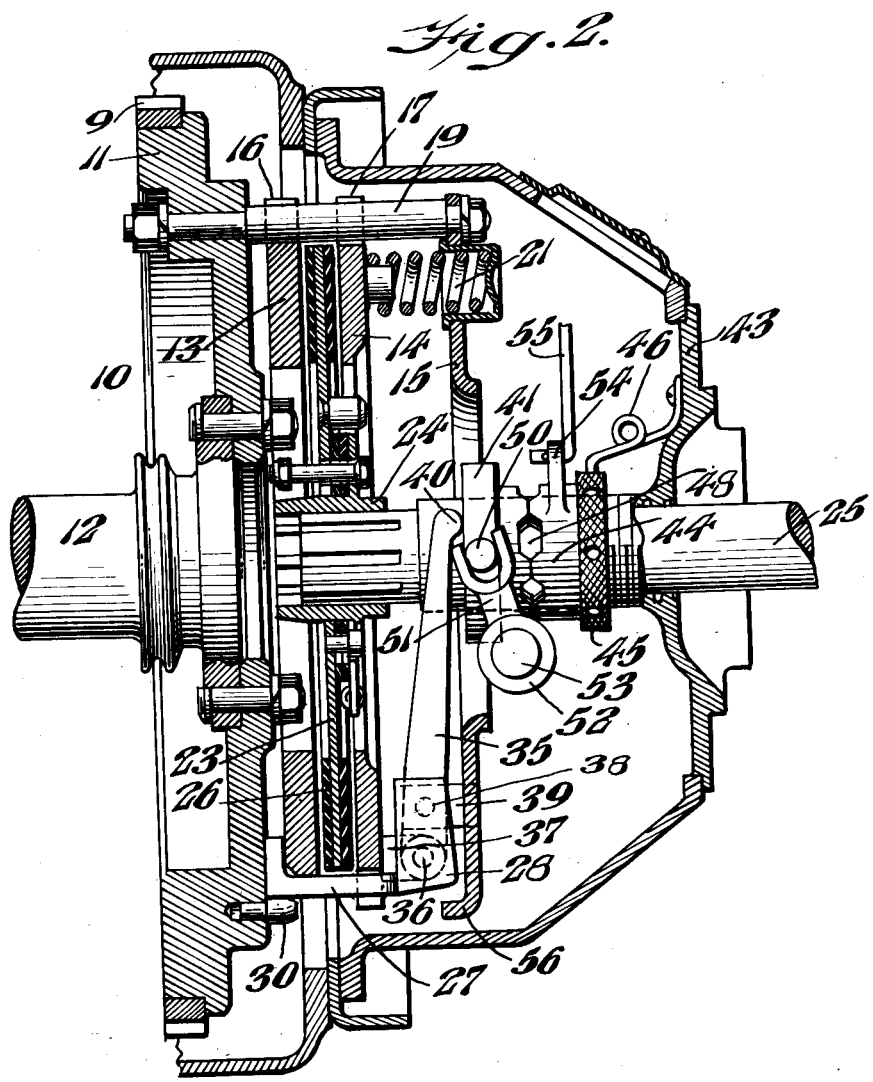
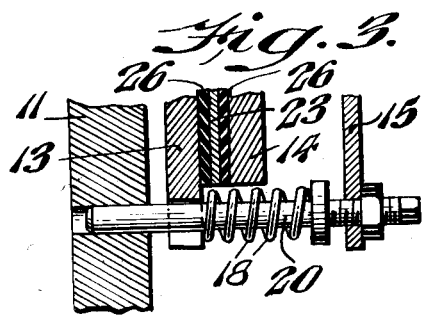

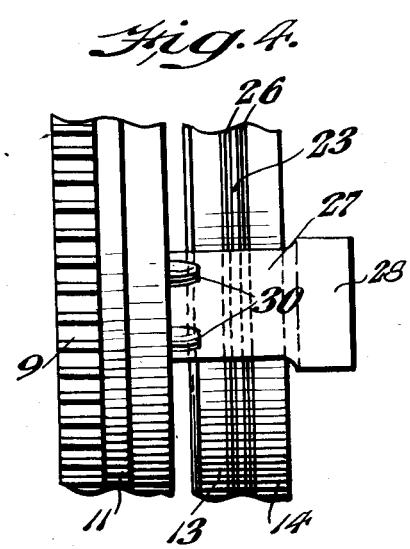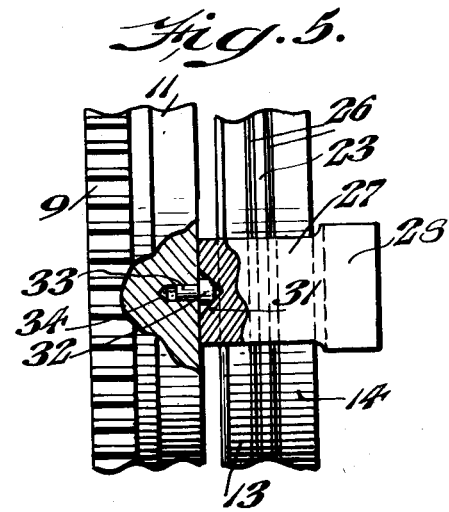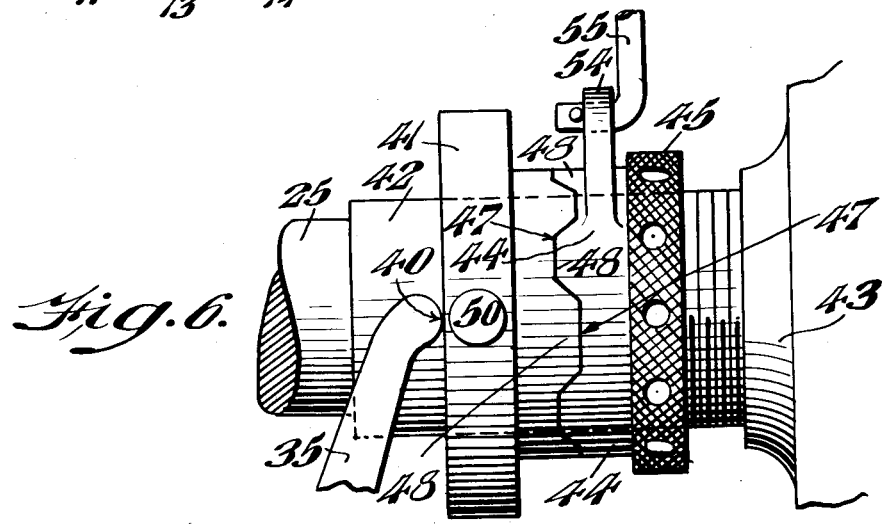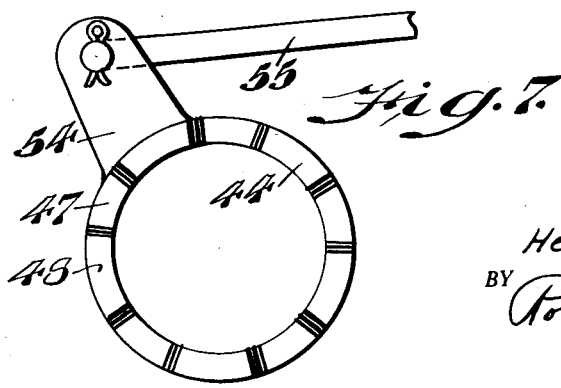

Patented Sept. 8, 1931

1,822,716

UNITED STATES PATENT OFFICE

HENRY H. VAIL, OF CAMDEN, NEW JERSEY, ASSIGNOR TO AUTOMATIC DRIVE AND TRANSMISSION COMPANY, OF GLOUCESTER CITY, NEW JERSEY, A CORPORATION OF NEW JERSEY

SELECTIVE CLUTCH MECHANISM

Application filed May 22, 1929. Serial No. 364,984.

The present invention relates to clutch mechanism and more particularly to a combination automatically and manually controlled clutch for motor vehicles.

Some of the objects of the present invention are to provide an improved means for transmitting power from a driving member to a driven member; to provide a simple and efficient clutch wherein starting, stopping and operating of the vehicle takes place without shifting of gears from one speed ratio to another; to provide a centrifugal control for clutches wherein a positive operation of the clutch plates is had at all times; to provide a selecting mechanism for clutches whereby an automatically operated clutch can be converted at will into an ordinary manually controlled clutch and vice versa; to provide a fulcrum means for the centrifugally controlled levers wherein free swing of the levers takes place at all operating speeds; to provide a fulcrum construction which not only maintains the weighted levers supported in inoperative position but functions during the swing of the levers, when operating, to maintain an effective short arm leverage; and to provide other improvements as will hereinafter appear.

In the accompanying drawings Fig. 1 represents an end elevation of an automatic clutch embodying one form of the present invention; Fig. 2 represents a section taken axially through the device, but including the addition of one form of clutch control and selecting means; Fig. 3 represents a sectional detail of a form of spring pressed friction plate holding means; Fig. 4 represents a portion of the fly wheel showing details of one form of counter weight mounting; Fig. 5 represents a like portion to Fig. 4 but showing a modified form of the invention; Fig. 6 represents a side elevation of a portion of the selecting mechanism showing a different position from Fig. 2; and Fig. 7 represents a detail in side elevation of the selector actuating means.

Referring to the drawings a clutch mechanism 10 is shown, by way of example, as suitable for equipment with an automatic drive and selective control embodying one form of the present invention. Generally considered the clutch mechanism 10 consists of a fly wheel 11 fixed to a driving shaft 12 and having a gear 9 for starting purposes. As here shown the clutch parts include a driving annular plate 13 and an annular control plate 14 both of which are driven by the fly wheel 11 through the medium of bolts 19 which extend laterally from the fly wheel and hold a ring 15 in spaced relation to the fly wheel. The bolts 19 pass through peripheral slots 16 and 17 in the respective plates 13 and 14 but have sufficient clearance to permit free relative sliding movement of the plates axially along the bolts 19. The driving plate 13 is preferably maintained spaced from the control plate 14 by coil springs 18 respectively carried by studs 20 bolted to the ring 15 and extending into the fly wheel to follow the movement thereof. The control plate 14 is under the pressure of a plurality of coil springs 21 held respectively compressed between cap bushings 22 and the outer face of the control plate 14 so that the latter is normally forced toward the plate 13.

Motion is transmitted from the plates 13 and 14 to a driven disc 23 which is fast upon a hub 24 splined for relative axial sliding movement on a driven shaft 25. The outer circumferential portion of the disc 23 lies between two plate rings 26 of friction material interposed between the plates 13 and 14, so that shifting of either plate 13 or 14 toward the other will cause rotation of the driven disc 23. These rings 26 are fast to the disc 23 and are the friction members which transmit the power and prevent wear as well as slipping of the clutch disc 23.

For automatically moving the plate 13 to lock the driving and driven elements together, the outer peripheral edges of the plates 13 and 14 are slotted at suitable intervals to receive respectively the long arms of transversely disposed levers 27, the free ends of which respectively terminate in weights 28 to be subject to centrifugal forces. The short arms of the levers 27 are held by the spring pressed action of the plate 13 against the inner face of the fly wheel 11, and are fulcrumed upon pins 30 projecting outwardly from the face of the fly wheel to abut and support the respective levers 27. As here shown each lever 27 is fulcrumed upon two of the pins 30, and the head of each rounded to converge toward the outer end of the pin. The contour of each rounded head is generally designed to correspond to the arc of travel of its lever 27 and hence the lever arm 27 rides along the face of the head to maintain a positive fulcrum without giving any resistance to the outward swing of the weight 28. It will thus be seen from Fig. 4 that each weighted lever arm 27 is fulcrumed upon two heads of the pins 30 and hence is prevented from axial turning during its swinging motion while an effective thrust is given to the short arm of the lever 27 to force the clutch discs together for driving purposes. The whole supporting fulcrum structure is such as to allow the weights the required free swinging action under centrifugal forces and at the same time maintaining a fixed point about which the moment of force acts.

In Figure 5 of the drawings a modified fulcrum structure is provided wherein the short arm of the weight lever 27 is provided with a V or conical seat 31 in its face next to the fly wheel and in which is received the head 32 of a single fulcrum pin 33, the shank of which seats in a socket 34 provided in the fly wheel as will be understood. This form of the invention also serves to hold the several weighted structures in positive engaging relation and insures the required free swinging of the weights about the fixed fulcrum. This free swinging of the weight levers takes place while a positive fulcrum bearing is maintained on the pin by reason of the contour of the head which has a curvature corresponding to the arc of travel of the lever. In this way lost motion and play of the weight levers relative to the fly wheel and friction plates is prevented and the desired positive rocking leverage is obtained.

For the purpose of adjusting and locating the control plate 14 so that it can assume the proper positions for automatic and manual operation, a plurality of levers 35, here shown as three, are pivoted respectively at 36 in ears 37 projecting from the outer face of the plate 14 at equal distances apart. These levers 35 are fulcrumed respectively at 38 in ears 39 fixed to and projecting inwardly from the ring 15 at points to provide short lever arms at the pivoted ends of the levers and long free arms which terminate in aligned relation to the axial opening in the ring 15. The levers 35 are of the same length and terminate in bearing ends 40 which are machined after assembly while under the pressure of the springs 21 to ensure the three ends 40 lying in the same vertical plane. The levers 35 are held in any adjusted position or changed from one position to another by a collar 41 having a face parallel to the plane of the ends 40 and arranged to bear against said ends. This collar 41 is keyed for axial sliding upon a tubular extension 42 of a main housing 43 and through which extension the driven shaft 25 passes to enter the hub 24. The collar 41 is held as an abutment against the lever ends 40 by a selecting collar 44 rotatably and slidably mounted upon the extension 42 and seating against an adjustable ring nut 45 screw threaded upon the extension 42. This ring nut 45 is preferably radially apertured about its periphery to receive a suitable tool for turning it to a new position, where it can be locked by a latch spring 46 mounted on a fixed part and arranged to seat in a selected locking aperture. Since the collar 41 bears against the selecting collar 44 and the latter bears against the set ring nut 45, the levers 35 are held fixed by the springs 21 and thereby the operating position of the control plate 14 is determined. It will be understood that the position of the extension 42 with respect to the clutch parts is such that (taking into consideration the combined length of the collars 41 and 44) the control plate 14 can be initially assembled very close to its proper working position. Final adjustment can then be made by turning the ring nut 45. The construction as above described applies to the locating of the plate 14 for automatic control because the combined length of the two collars holds the plate 14 spaced from the adjacent clutch disc so that the clutch can run free when the fly wheel is running with the vehicle standing still.

As a means for changing the position of the plate 14 so that it assumes friction engaging relation with the disc 23 and associated parts, the meeting sides of the two collars 41 and 44 are each provided with circumferential spaced grooves 47 complemental in character so that when one collar is turned relative to the other the formed projections 48 of each collar will seat in the respective grooves 47 of the other collar and thus reduce the combined length of the collars by an amount equal to the depth of a projection 48. Thus, as seen in Fig. 6, the interfitting of the grooves 47 and projections 48 allows the collar 41 to move to the right as seen in this figure and thereby permit the ends of the levers 35 to move a corresponding distance to the right so that the control plate 14 can have a further movement to the left under the influence of the springs 21. This added movement of the control plate 14 brings it into clutching relation with the other clutch plates and causes motion to be transmitted from the driving shaft to the driven shaft 25 and the operation corresponds to the ordinary manual control clutch which is in clutching position at all times unless the clutch pedal is shifted to withdraw the control plate 14. In order that manual shifting of the control plate 14 to declutched position can take place at will, the collar 41 is provided with diametrically opposite yoke pins 50 which seat respectively in the yoke arms 51 of a rock hub 52 which is fixed to a shaft 53 to the end of which the usual clutch pedal lever is connected for operation.

For the purpose of turning the control collar 44 from one control position to another it is provided with an integral projecting lug 54 to which an operating rod 55 is connected and leads to a convenient location near the operator of the vehicle. By pulling the rod 55 the collar 44 can be turned so that the projections 48 have one relative position with respect to each other, and when the rod 55 is pushed in the opposite direction these projections have a different relative position. These two distinct positions determine whether the clutch control plate 14 is in its position for automatic operation or is in its position for manual control.

In order that the outward swing of the weights 28 under centrifugal force can be limited to the maximum thrust required for all operating speeds, the ring 15 is provided with an inwardly turned circumferential flange 56. The depth of this flange 56 is such as to bring it into the plane of movement of the weights 28 when swinging outwardly and the spacing of the flange 56 from the weights 28 allows the latter to swing outwardly far enough to give the desired maximum frictional engagement of the clutch plates while preventing the weights from developing such a force as to cause breakage and damage to the assembly.

It will now be apparent that a complete unitary clutch mechanism has been devised capable of efficient operation under both manual and automatic control and whereby changing from manual control to automatic control or from automatic control to manual control can be successfully accomplished at the will of the operator. Also that a simple and effective mounting for the levers of centrifugal weights has been devised which ensures ease of assembly and correct permanent relation between the operating parts. Furthermore the provision of a fulcrum having a contour following the curve of motion of the weighted levers maintains a maximum lever thrust in any operative position of the weights and eliminates slip and lost motion.

Having thus described my invention, I claim:

1. A clutch mechanism comprising a driving member, a driven member and a plurality of friction plates arranged when in contact to transmit motion from one member to the other, in combination with centrifugally controlled means for automatically bringing said plates into contact relation, means for manually controlling said plates, and means including a selecting device operable to either of two positions at will for setting one of said plates with respect to another whereby said clutch can be operated either automatically or manually.

2. A clutch mechanism comprising a driving member, a driven member and a plurality of friction plates arranged when in contact to transmit motion from one member to the other, in combination with centrifugally controlled means for automatically bringing said plates into contact relation, means for manually controlling said plates, and means including a selecting device operable to either of two positions at will manually operable at will for setting one of said plates with respect to another whereby said clutch can be operated either automatically or manually.

3. A clutch mechanism comprising a driving member, a driven member, a driving plate operated by said driving member, a control plate driven by said driving member, and a driven plate between said driving plate and said control plate, in combination with means including centrifugally operated weights for moving said driving plate against said driven plate, a spring for pressing said control plate toward said driven plate, a plurality of levers respectively fulcrumed to simultaneously move said control plate in opposition to said spring, and means for setting said levers in either of two positions, whereby said control plate is either in pressure relation with said driven plate for manual control purposes or is spaced from said driven plate for automatic control purposes.

4. A clutch mechanism comprising a driving member, a driven member, a driving plate operated by said driving member, a control plate driven by said driving member, and a driven plate between said driving plate and said control plate, in combination with means including centrifugally operated weights for moving said driving plate against said driven plate, a spring for pressing said control plate toward said driven plate, a plurality of levers respectively fulcrumed to simultaneously move said control plate in opposition to said spring, and common means for setting said levers in either of two positions, whereby said control plate is either in pressure relation with said driven plate for manual control purposes or is spaced from said driven plate for automatic control purposes.

5. A clutch mechanism comprising a driving member, a driven member, a driving plate operated by said driving member, a control plate driven by said driving member, and a driven plate between said driving plate and said control plate, in combination with means including centrifugally operated weights for moving said driving plate against said driven plate, a spring for pressing said control plate toward said driven plate, a plurality of levers respectively fulcrumed to simultaneously move said control plate in opposition to said spring, a fixed part a selecting device interposed between the free ends of said levers and said fixed part to hold said levers in a position to give a predetermined setting of said control plate, and means to vary said selecting device to hold said levers in a different position to give another predetermined setting of said control plate.

6. A clutch mechanism comprising a driving member, a driven member, a driving plate operated by said driving member, a control plate driven by said driving member, and a driven plate between said driving plate and said control plate, in combination with means including centrifugally operated weights for moving said driving plate against said driven plate, a spring for pressing said control plate toward said driven plate, a plurality of levers respectively fulcrumed to simultaneously move said control plate in opposition to said spring, a fixed part a selecting device interposed between the free ends of said levers and said fixed part to hold said levers in a position to give a predetermined setting of said control plate, and means to vary the length of said selecting device to hold said levers in a different position to give another predetermined setting of said control plate.

7. A clutch mechanism comprising a driving member, a driven member, a driving plate operated by said driving member, a control plate driven by said driving member, and a driven plate between said driving plate and said control plate, in combination with means including centrifugally operated weights for moving said driving plate against said driven plate, a spring for pressing said control plate toward said driven plate, a plurality of levers respectively fulcrumed to simultaneously move said control plate in opposition to said spring, a collar mounted to engage said levers simultaneously to hold said levers in a predetermined position, means including a pair of complemental recessed faces for changing the position of said collar with respect to said levers, and manually operated means for actuating said changing means at will whereby said collar is shifted from one predetermined position to another.

8. A clutch mechanism comprising a driving member, a driven member, a driving plate operated by said driving member, a control plate driven by said driving member, and a driven plate between said driving plate and said control plate, in combination with means including centrifugally operated weights for moving said driving plate against said driven plate, a spring for pressing said control plate toward said driven plate, a plurality of levers respectively fulcrumed to simultaneously move said control plate in opposition to said spring, a collar mounted to engage said levers simultaneously to hold said levers in a predetermined position, means including a pair of relatively rotatable complemental recessed faces for changing the position of said collar with respect to said levers, and manually operated means for rotating one of said faces at will whereby said collar is shifted from one predetermined position to another.

9. A clutch mechanism comprising a driving member, a driven member, a driving plate operated by said driving member, a control plate driven by said driving member, and a driven plate between said driving plate and said control plate, in combination with means including centrifugally operated weights for moving said driving plate against said driven plate, a spring for pressing said control plate toward said driven plate, a plurality of levers respectively fulcrumed to simultaneously move said control plate in opposition to said spring, a collar mounted to engage said levers simultaneously to hold said levers in a predetermined position, means including a pair of relatively rotatable complemental recessed faces for changing the position of said collar with respect to said levers, manually operated means for rotating one of said faces at will whereby said collar is shifted from one predetermined position to another, and means independent of said manually operated means for adjusting said collar to a third predetermined position.

10. In an automatic clutch a driving fly wheel, a driven member, and interposed friction plates, in combination with a plurality of centrifugally operated levers, each lever having a short arm between said fly wheel and said friction plates and a weighted long arm, and a fulcrum for each lever projecting from and fixed to said fly wheel.

11. In an automatic clutch a driving fly wheel, a driven member, and interposed friction plates, in combination with a plurality of centrifugally operated levers, each lever having a short arm between said fly wheel and said friction plates and a weighted long arm, and a fulcrum for each lever projecting from and fixed to said fly wheel, each fulcrum having a curved supporting face to maintain contact with its lever in all operative positions of said levers.

12. In an automatic clutch a driving fly wheel, a driven member, and interposed friction plates, in combination with a plurality of centrifugally operated levers, each lever having a short arm between said fly wheel and said friction plates and a weighted long arm, and pins projecting from the inner face of said fly wheel to form supports and fulcrums respectively for said levers.

13. In an automatic clutch a driving fly wheel, a driven member, and interposed friction plates, in combination with a plurality of centrifugally operated levers, each lever having a short arm between said fly wheel and said friction plates and a weighted long arm, pins projecting from the inner face of said fly wheel to form supports and fulcrums respectively for said levers, and heads on said pins forming a curving riding face for each lever.

14. In an automatic clutch a driving fly wheel, a driven member, and interposed friction plates, in combination with a plurality of centrifugally operated levers, each lever having a short arm between said fly wheel and said friction plates and a weighted long arm, each short arm having a recess, and pins respectively projecting from the inner face of said fly wheel and seating respectively in said recesses to form supports and fulcrums respectively for said levers.

Signed at Philadelphia, county of Philadelphia, State of Pennsylvania, this 6th day of May, 1929.

HENRY H. VAIL.